(12) United States Patent
Traywick et al.

(10) Patent No.: US 12,470,502 B2
(45) Date of Patent: Nov. 11, 2025

(54) MACHINE LEARNING-BASED ANOMALY DETECTION

(71) Applicant: Bank of America Corporation, Charlotte, NC (US)

(72) Inventors: Edward Lee Traywick, Bellbrook, OH (US); Joshua Johnson, Denver, NC (US); Laura Stillman Lavender, Washington, DC (US)

(73) Assignee: Bank of America Corporation, Charlotte, NC (US)

( * ) Notice: Subject to any disclaimer, the term of this patent is extended or adjusted under 35 U.S.C. 154(b) by 88 days.

(21) Appl. No.: 18/588,642

(22) Filed: Feb. 27, 2024

(65) Prior Publication Data

US 2025/0274410 A1    Aug. 28, 2025

(51) Int. Cl.
*H04L 51/04* (2022.01)
*H04L 9/40* (2022.01)
*H04L 41/16* (2022.01)
*H04L 67/51* (2022.01)
*H04W 12/121* (2021.01)

(52) U.S. Cl.
CPC .............. *H04L 51/04* (2013.01); *H04L 41/16* (2013.01); *H04L 63/1425* (2013.01); *H04L 67/51* (2022.05); *H04W 12/121* (2021.01)

(58) Field of Classification Search
CPC ..... H04L 51/04; H04L 67/535; H04L 51/224; H04L 67/51; H04L 63/1441; H04L 43/04; H04L 41/0654; H04L 51/18; H04L 63/1425; H04L 63/0861; H04L 67/30; H04L 67/306; H04L 51/046; H04L 43/062; H04L 63/1408; G06Q 10/107; G06Q 20/40145; G06Q 20/12; G06Q 20/4016; G06Q 30/0609; G06Q 30/0185; G06Q 10/0635; H04W 12/121; H04W 12/128; H04W 12/12; H04W 12/67; G06N 20/20; G06N 20/00; G06F 21/554
See application file for complete search history.

(56) References Cited

U.S. PATENT DOCUMENTS

| | | | |
|---|---|---|---|
| 9,215,244 B2 | 12/2015 | Ayyagari et al. | |
| 9,275,065 B1 | 3/2016 | Ganesh et al. | |
| 9,767,302 B2 | 9/2017 | Lim | |
| 10,003,605 B2 | 6/2018 | Muddu et al. | |
| 2018/0006989 A1* | 1/2018 | Dotan-Cohen | H04L 51/04 |
| 2022/0116415 A1* | 4/2022 | Burgis | H04L 67/51 |
| 2024/0330934 A1* | 10/2024 | Karimli | H04W 12/121 |

* cited by examiner

*Primary Examiner* — Kyung H Shin
(74) *Attorney, Agent, or Firm* — Banner & Witcoff, Ltd.

(57) ABSTRACT

Arrangements for machine learning-based anomaly detection are provided. In some examples, historical data related to user interactions with enterprise organization resources and location may be received and used to train a machine learning model. Current user interaction data, as well as current location data, may be received. The current user interaction data and location data may be input to the machine learning model and the model may be executed to detect any anomalies in the data. If no anomalies are detected, the process may return to receive subsequent user interaction and location data for analysis. If an anomaly is detected, a notification may be generated and transmitted to an administrator computing device for display by the device.

20 Claims, 10 Drawing Sheets

MACHINE LEARNING-BASED ANOMALY DETECTION

BACKGROUND

Aspects of the disclosure relate to machine learning-based anomaly detection.

Large enterprise organizations may be susceptible to various threats. While many threats are based outside of the enterprise organization, internal threats can be harmful to the organization as well. In conventional arrangements, upon detection of an insider threat or incident, organizations may attempt to hastily assemble data related to a user associated with the incident, their use of enterprise organization resources, and the like. However, this reactive approach might not mitigate all impact and might not accurately capture all aspects of the user's interactions with various resources. Accordingly, it would be advantageous to assemble, on a continuous or near-continuous basis, user data identifying expected user patterns for a respective user and use machine learning to analyze the data and identify any anomalies in data that may indicate a potential for incident.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated detecting anomalies in user patterns.

In some examples, historical data related to user interactions with enterprise organization resources and location may be received and used to train a machine learning model. Current user interaction data, as well as current location data, may be received. The current user interaction data and location data may be input to the machine learning model and the model may be executed to detect any anomalies in the data. If no anomalies are detected, the process may return to receive subsequent user interaction and location data for analysis. If an anomaly is detected, a notification may be generated and transmitted to an administrator computing device for display by the device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, insider threats are a common cause for concern in various enterprise organizations. Particularly in large enterprise organizations, it may be difficult to quickly identify potential threats from those internal to the organization. Accordingly, aspects described herein continuously or near-continuously capture user data throughout a work day to establish baseline or expected patterns for users within the enterprise organization.

For instance, as users interact with enterprise organization resources (e.g., provide input to a computing device, print documents, create and send communications, log in to systems or applications, move about an enterprise location, or the like) data may be captured and used to build a user profile that may include baseline or expected patterns for a respective user. As additional data related to user interactions and/or location is received, the data may be analyzed, using machine learning, to identify anomalies in the data that may indicate a potential threat. Notifications may be generated and transmitted to one or more computing devices for display.

These and various other arrangements will be discussed more fully below.

Figure 1A:
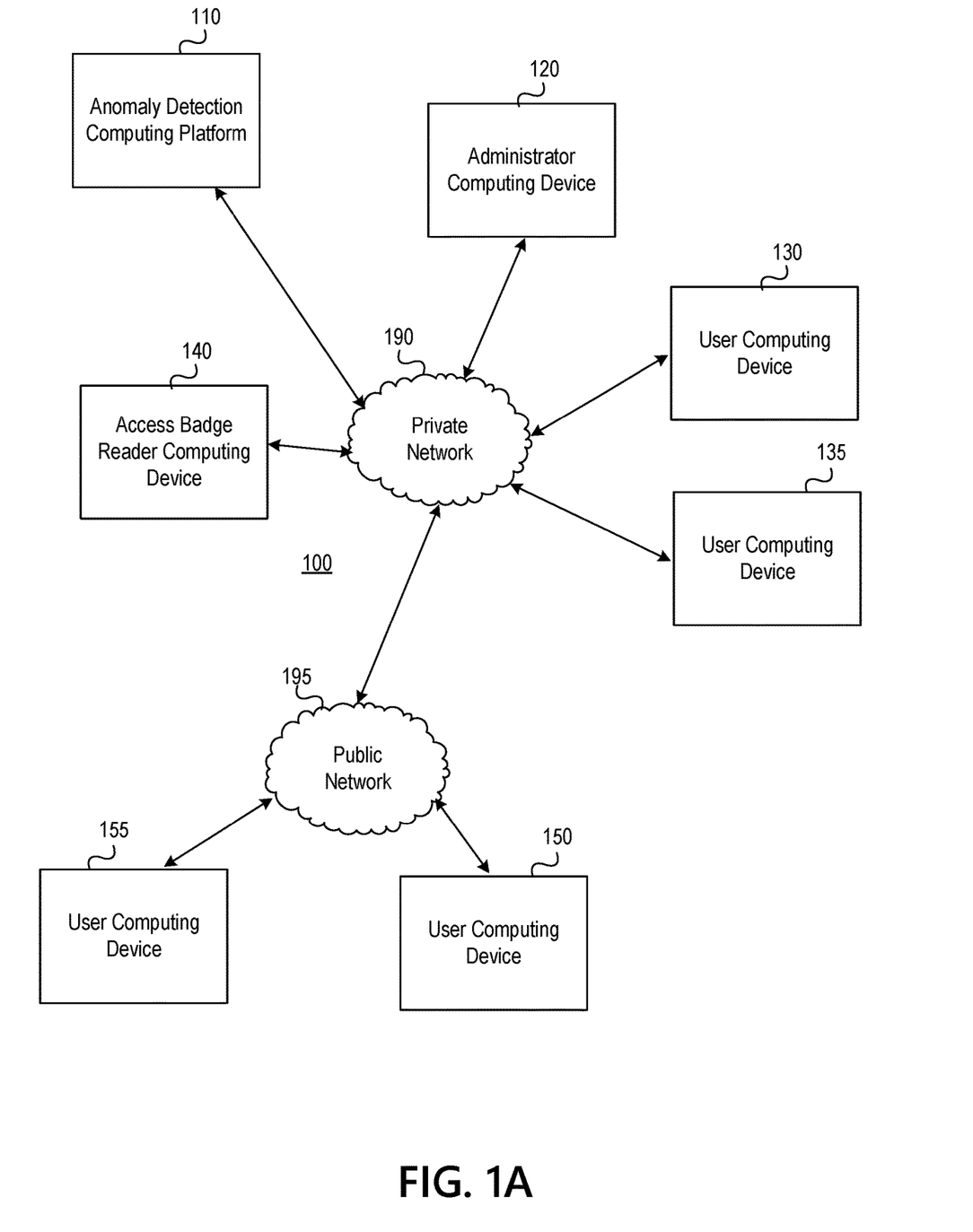
FIGS. 1A-1B depict an illustrative computing environment for machine learning-based anomaly detection in accordance with one or more aspects described herein.
Figure 1B:
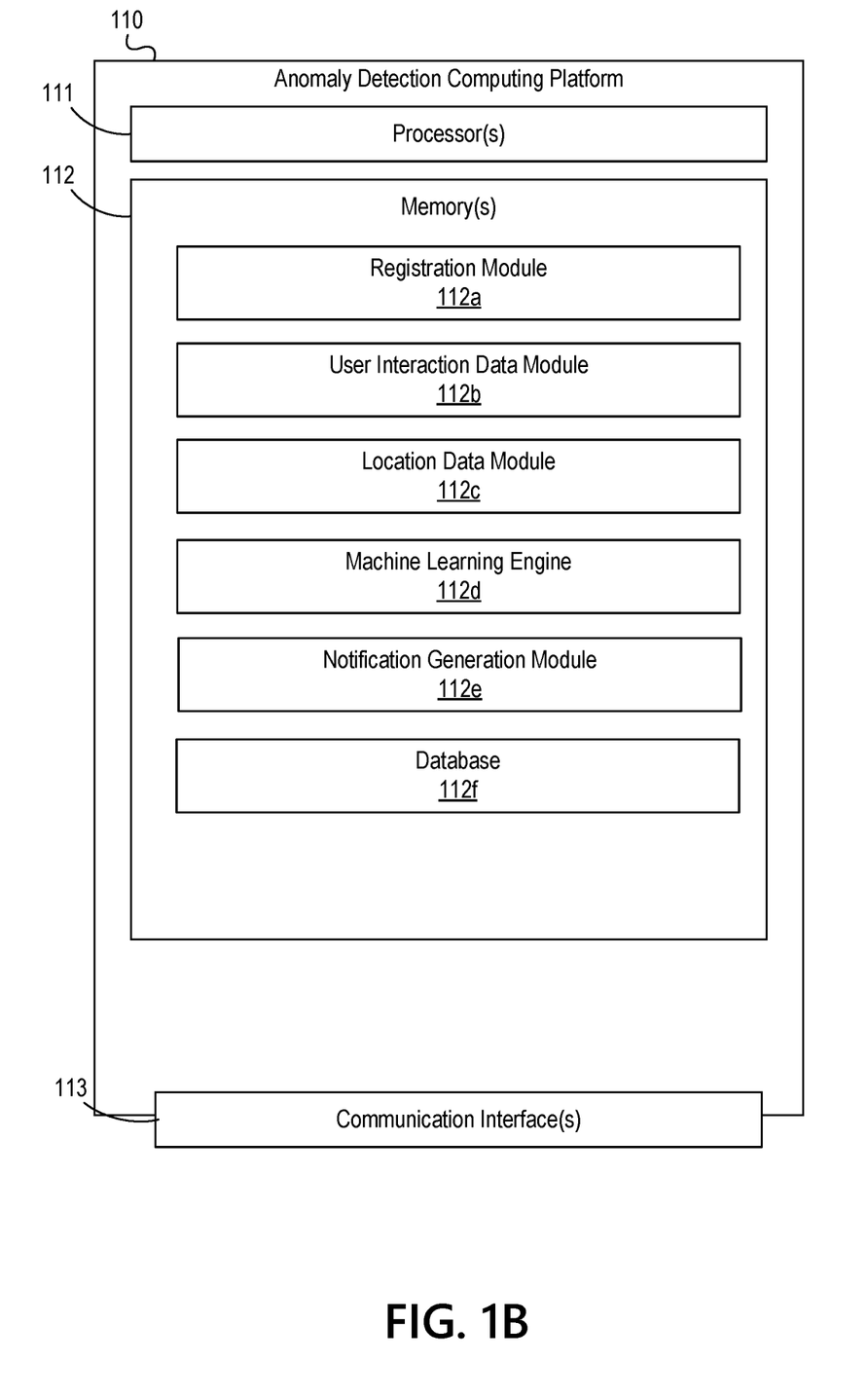

FIGS. 1A-1B depict an illustrative computing environment for implementing machine learning-based anomaly detection in accordance with one or more aspects described herein. Referring to FIG. 1A, computing environment 100 may include one or more computing devices and/or other computing systems. For example, computing environment 100 may include anomaly detection computing platform 110, administrator computing device 120, user computing device 130, user computing device 135, access badge reader computing device 140, user computing device 150 and user computing device 155. Although one administrator computing device 120, two user computing devices 130, 135, one access badge reader computing device 140 and two user computing devices 150, 155 are shown, any number of systems or devices may be used without departing from the invention.

Anomaly detection computing platform 110 may be or include one or more computing devices (e.g., servers, server blades, or the like) and/or one or more computing components (e.g., memory, processor, and the like) and may be configured to provide dynamic, efficient, intelligent detection of anomalies in user behavior and generate recommended actions. For instance, anomaly detection computing platform 110 may receive user interaction data from a plurality of user devices. The plurality of user devices may be associated with a plurality of users (e.g., employees of an enterprise organization) that are registered with the system and provided permission for data to be captured. In some examples, the user interaction data may include applications or systems accessed by a user, a sequence or order in which one or more applications or systems are accessed by a user, web browser history, keystroke or other keyboard input data of the user (e.g., user input to an enterprise organization computing device such as user computing device 130 or user computing device 135), mouse data of the user (e.g., user input to an enterprise organization computing device such as user computing device 130 or user computing device 135), printing data associated with the user, content of communications or attachments sent by the user either internally or externally (e.g., via email, SMS, or the like), and the like.

Anomaly detection computing platform 110 may receive location data associated with the plurality of users. In some examples, the location data may be received from an access badge reader computing device 140 that detects a radio frequency identification (RFID) signal from a user's identification or other access badge in order to provide access to the user to particular enterprise organization spaces. The location data may be captured continuously or throughout a predetermined time (e.g., during a work day) based on user proximity to one or more access badge reader computing devices 140 in the enterprise organization location. Additionally or alternatively, location data may be received from an enterprise organization provided mobile computing device associated with the user, such as user computing device 150 or user computing device 155. For instance, a user may have a smart phone, tablet, wearable device, or other mobile device provided by the enterprise organization. Location data from a global positioning system (GPS) within the device may be received and user to determine location data associated with a user.

Anomaly detection computing platform 110 may train a machine learning model using the received user interaction data and location data. For instance, patterns or sequences in the data may be identified and used to correlate users to particular behaviors or operation patterns. In some examples, user profiles storing these behaviors or operation patterns may be generated for each user of the plurality of users.

Anomaly detection computing platform 110 may receive subsequent user interaction and location data. For instance, after training the machine learning model, additional or subsequent real-time or near real-time user interaction data and location data may be received. The subsequent interaction data and location data may be input to the machine learning model and the model may be executed to determine whether the subsequent data includes any anomalies or deviations from the behaviors or operation patterns identified for a particular user. If not, the system may continue analysis of subsequently received data. If an anomaly is detected, a notification may be generated and transmitted to an administrator computing device 120. In some examples, the notification may include dynamic interface elements that may change in size, shape or color as an impact of the anomaly is determined (e.g., if additional anomalies are detected for other users in a similar role, within a business unit or the like), as an anomaly is addressed, as mitigation actions are executed, or the like.

In some examples, anomaly detection computing platform 110 may identify one or more mitigation actions for execution. For instance, if the anomaly indicates a potential insider threat, access to one or more systems or applications may be limited or removed for the user. Various other mitigation actions may be used without departing from the invention.

Administrator computing device 120 may be or include one or more computing devices, such as laptop computers, tablet computers, smart phones, wearable devices, and the like. In some examples, administrator computing device 120 may be associated with a supervisor or administrator who may be tasked with gathering information related to a potential insider threat, or for an issue that has been identified. In some examples, administrator computing device 120 may display one or more notifications, execute one or more mitigation actions, or the like.

User computing device 130 and/or user computing device 135 may be or include one or more computing devices, such as laptop computers, tablet computers, smart phones, wearable devices, and the like. In some examples, user computing device 130 and/or user computing device 135 may be associated with one or more employees of the enterprise organization for use in the normal course of business. For instance, employee users may use user computing device 130 and/or user computing device 135 to access applications, systems and/or perform various job functions within the enterprise organization.

Access badge reader computing device 140 may be or include one or more devices configured to detect a signal associated with an access badge, identification badge or other key card type device used by employees of the enterprise organization to access locations within or around the enterprise organization. For instance, access badge reader computing device 140 may detect an RFID signal, near-field communication signal, or the like, associated with an access badge of a user in order to provide or deny access to locations. The detection of a signal by an access badge reader computing device 140 indicates a presence of the user (e.g., based on the identifier associated with the badge) at a particular location within proximity of the access badge reader computing device 140 and can be used to understand a location of a user within a space or at a location of the enterprise organization. In some examples, multiple access badge reader computing devices may be distributed throughout an enterprise organization location such that a location of a user may be determined at multiple times throughout a predetermined time period, such as a work day, in order to understand a location of a user as the user moves through their work day.

User computing device 150 and/or user computing device 155 may be or include one or more computing devices, such as laptop computers, tablet computers, smart phones, wearable devices, and the like. In some examples, user computing device 150 and/or user computing device 155 may be associated with one or more employees of the enterprise organization for use in the normal course of business. In some arrangements, user computing device 150 and/or user computing device 155 may be a personal computing device of an employee used to access one or more systems or applications of the enterprise organization (e.g., when remote or not physically present at an enterprise organization location), may be a mobile device provided to the user by the enterprise organization for use in the normal course of business, or the like.

As mentioned above, computing environment 100 also may include one or more networks, which may interconnect one or more of anomaly detection computing platform 110, administrator computing device 120, user computing device 130, user computing device 135, access badge reader computing device 140, user computing device 150 and/or user computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, anomaly detection computing platform 110, administrator computing device 120, user computing device 130, user computing device 135, and/or access badge reader computing device 140 may be associated with an enterprise organization (e.g., a financial institution), and private network 190 may be associated with and/or operated by the organization, and may include one or more networks (e.g., LANs, WANs, virtual private networks (VPNs), or the like) that interconnect anomaly detection computing platform 110, administrator computing device 120, user computing device 130, user computing device 135, and/or access badge reader computing device 140 and one or more other computing devices and/or computer systems that are used by, operated by, and/or otherwise associated with the organization. Public network 195 may connect private network 190 and/or one or more computing devices connected thereto (e.g., anomaly detection computing platform 110, administrator computing device 120, user computing device 130, user computing device 135, and/or access badge reader computing device 140) with one or more networks and/or computing devices that are not associated with the organization. For example, user computing device 150 and/or user computing device 155 might not be associated with an organization that operates private network 190 (e.g., because user computing device 150 and/or user computing device may be owned, operated, and/or serviced by one or more entities different from the organization that operates private network 190, one or more customers of the organization, one or more employees of the organization, public or government entities, and/or vendors of the organization, rather than being owned and/or operated by the organization itself or may be owned by the organization with permission of the user to use the device outside of the organization), and public network 195 may include one or more networks (e.g., the internet) that connect user computing device 150 and/or user computing device 155 to private network 190 and/or one or more computing devices connected thereto (e.g., anomaly detection computing platform 110, administrator computing device 120, user computing device 130, user computing device 135, and/or access badge reader computing device 140).

Referring to FIG. 1B, anomaly detection computing platform 110 may include one or more processors 111, memory 112, and communication interface 113. A data bus may interconnect processor(s) 111, memory 112, and communication interface 113. Communication interface 113 may be a network interface configured to support communication between anomaly detection computing platform 110 and one or more networks (e.g., network 190, network 195, or the like). Memory 112 may include one or more program modules having instructions that when executed by processor(s) 111 cause anomaly detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of anomaly detection computing platform 110 and/or by different computing devices that may form and/or otherwise make up anomaly detection computing platform 110.

For example, memory 112 may have, store and/or include registration module 112*a*. Registration module 112*a* may store instructions and/or data that may cause or enable the anomaly detection computing platform 110 to receive registration data from an enterprise organization identifying a plurality of users (e.g., employees of the enterprise organization, and the like) as well as one or more devices associated with each user of the plurality of users (e.g., based on unique identifier of the computing device). In some examples, the registration data may be received from a database storing employee identifying information, expected location data for employees (e.g., expected or "home" location of each employee), access levels for data, systems and/or applications within the enterprise organization, and the like. The registration data may also include user permission data providing one or more permissions for the enterprise organization to capture user interaction and location data during a work day.

Anomaly detection computing platform 110 may further have, store and/or include user interaction data module 112*b*. User interaction data module 112*b* may store instructions and/or data that may cause or enable the anomaly detection computing platform 110 to receive user interaction data from computing devices associated with the plurality of enterprise organization users. For instance, systems or applications accessed by users via computing devices, user keyboard input data, user mouse data, printing data, content of communications or attachments sent internally and externally, use of multi-factor authentication, requests for assistance by a help desk (e.g., tickets generated), network behavior, and the like, may be received from the computing devices associated with the plurality of users.

Anomaly detection computing platform 110 may further have, store and/or include location data module 112*c*. Location data module 112*c* may store instructions and/or data that may cause or enable the anomaly detection computing platform 110 to receive location data associated with the plurality of users and/or user devices. For instance, location data module 112*c* may receive location data from one or more access badge reader computing devices 140, from mobile devices of the users (e.g., user computing device 150, user computing device 155, or the like) and the like. In some examples, location data may be received continuously or near continuously as a user goes about their work day (e.g., as a user moves around an office, attends meetings, or the like) from various access badge reader computing devices 140 within the enterprise organization location and/or from the mobile devices of the users. The location data may, in some examples, be GPS-based location coordinates, may be an indication of an area or room within a building, or the like.

Anomaly detection computing platform 110 may further have, store and/or include machine learning engine 112*d*. Machine learning engine 112*d* may store instructions and/or data that may cause or enable the anomaly detection computing platform 110 to train, execute, update and/or validate one or more machine learning models to receive, as inputs, current user interaction and/or location data and generate or output any detected anomalies from an established behavior or operation pattern of a respective user.

The machine learning model may be trained using previously captured and/or historical user interaction data, location data, and the like. For instance, the machine learning model may be trained using previous user keyboard or mouse input data, location history, data associated with applications or systems accessed and/or order or sequence of applications or systems accessed, history of printing, content of communications or attachments to communications, and the like, to identify patterns, sequences and/or correlations to establish a user profile or baseline behavior data for a respective user. For instance, if a particular user opens application A, followed by application B each work day morning, that correlation may be stored for the user. If, on a subsequent day, the user opens application C first, that may indicate that a threat actor is operating instead of the valid user. In some examples, training data may include previously detected anomalies and associated mitigating actions taken. Accordingly, as anomalies are detected, the machine learning model may, in some examples, identify an appropriate mitigating action.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data including location data, user input data, user communication content data, and the like) and/or unlabeled data.

Accordingly, machine learning engine 112d may receive, as inputs to the machine learning model, current user input data, location data, application or system data, and the like, and upon execution of the model, may identify any anomalies from a baseline or user profile identified for the particular user. In some examples, machine learning model may also output a proposed resolution or mitigating action to take in response to the detected anomaly (e.g., limit user access to one or more systems or applications, limit user communications externally, and the like).

Anomaly detection computing platform 110 may further have, store and/or include notification generation module 112e. Notification generation module 112e may store instructions and/or data that may cause or enable the anomaly detection computing platform 110 to receive an indication of an anomaly (e.g., as output by the machine learning model) and generate and transmit one or more notifications. In some examples, the notifications may be static notifications indicating that an anomaly has been detected and providing additional information about the anomaly. Additionally or alternatively, the notification may be a dynamic notification having dynamic interface elements that may change in size, shape and/or color based on different factors or parameters of the anomaly. For instance, if the anomaly may impact multiple systems (e.g., based on stored correlations between systems) the notification may include a large, red triangle indicating or representing the anomaly. Anomalies impacting one system may include a smaller, yellow circle. In some examples, data may be fed into the notification in real-time or near real-time such that as an anomaly is being addressed, a size, color and/or shape of the dynamic interface element may change. For instance, a newly identified anomaly may be presented as a first size. When an administrator is assigned to review the anomaly, a size of the interface element may be reduced to a smaller size, thereby indicating less urgency. Various other examples of dynamic interface elements may be used without departing from the invention.

Anomaly detection computing platform 110 may further have, store and/or include database 112f. Database 112f may store data related to user information, user profile information, historical data, detected anomalies, and/or other data that enables performance of aspects described herein by the anomaly detection computing platform 110.

FIGS. 2A-2D depict one example illustrative event sequence for anomaly detection in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
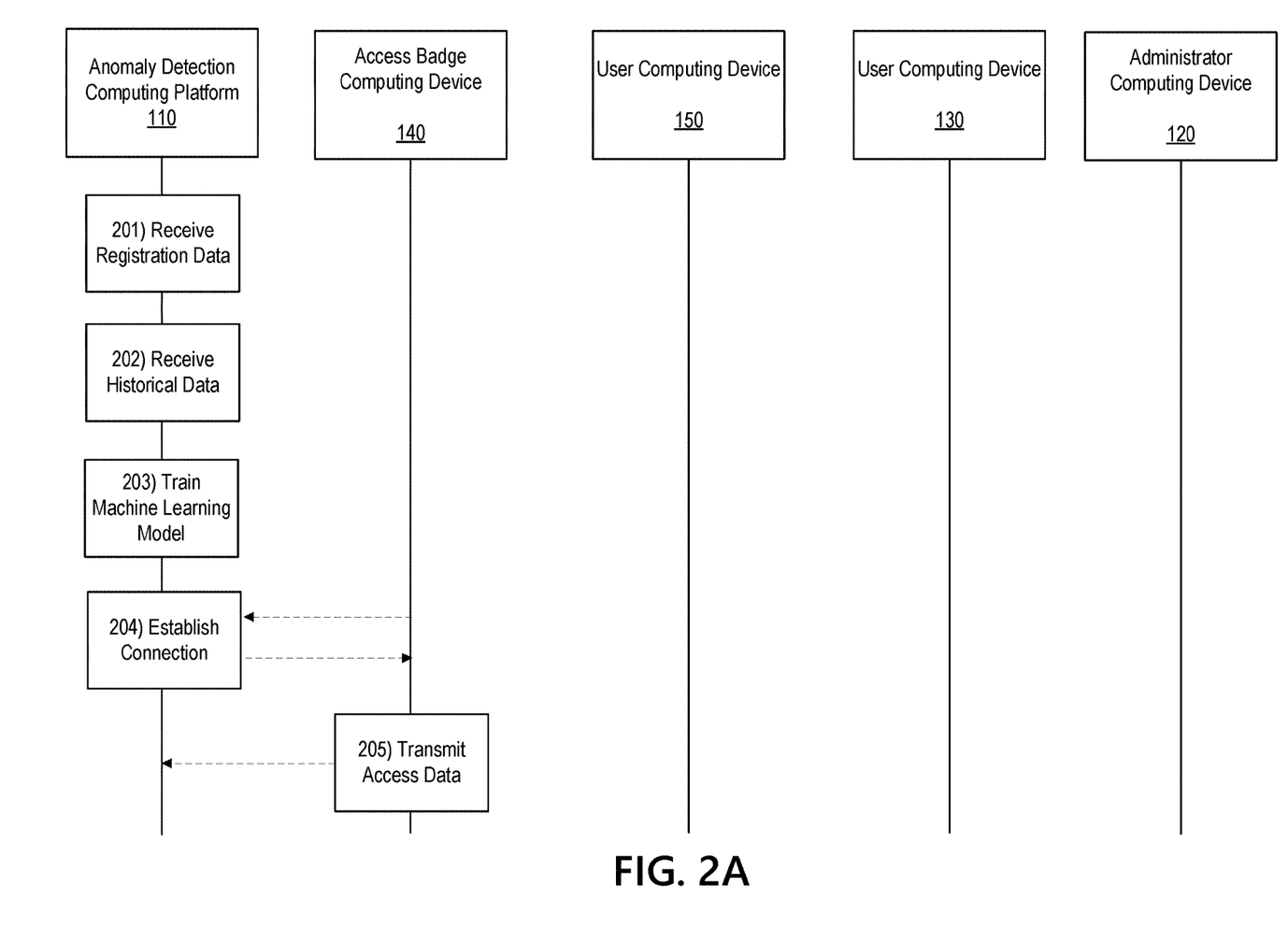
FIGS. 2A-2D depict an illustrative event sequence for machine learning-based anomaly detection in accordance with one or more aspects described herein.

With reference to FIG. 2A, at step 201, anomaly detection computing platform 110 may receive registration data. For instance, anomaly detection computing platform 110 may receive registration data related to employees of the enterprise organization, devices associated with each user, access permissions associated with each user (e.g., permission to access data, systems, applications, or the like), and the like.

At step 202, anomaly detection computing platform 110 may receive historical or previously captured user interaction and/or location data. For instance, data captured related to a user's location, systems or applications accessed via a computing device, user input to computing devices, and the like, may be received by the anomaly detection computing platform 110.

At step 203, the anomaly detection computing platform 110 may train a machine learning model. For instance, the historical or previously captured data received at step 202 may be used to train a machine learning model to receive, as inputs, current user interaction and location data and identify, based on the analyzed data, any anomalies in the data (e.g., differences between current data and previous established patterns, sequences or correlations associated with a user. In some examples, the model may be trained using previously detected anomalies and associated mitigation actions. In some arrangements, training the machine learning model may include identifying baseline or expected user behavior or operation patterns for each user that may be used to generate a user profile for a respective user.

At step 204, anomaly detection computing platform 110 may establish a wireless connection with access badge reader computing device 140. For instance, a first wireless connection may be established between anomaly detection computing platform 110 and the access badge reader computing device 140. Upon establishing the first wireless connection, a communication session may be initiated between the anomaly detection computing platform 110 and the access badge reader computing device 140.

Although one connection to one access badge reader computing device 140 is shown, in some examples, connections to multiple access badge reader computing devices may be established to enable communication between multiple access badge reader computing devices arranged throughout a location.

At step 205, access badge reader computing device 140 may transmit or send location data associated with one or more users. For instance, as a user's access badge is detected by the access badge reader computing device, an indication of a location of the user (e.g., based on a unique identifier associated with the access badge of the user) may be transmitted to the anomaly detection computing platform 110. In some examples, the location may be an indication of the location of the access badge reader computing device 140, may be a room or space within an enterprise organization location, may be coordinates of a location of the access badge reader computing device 140, or the like.

Figure 2B:
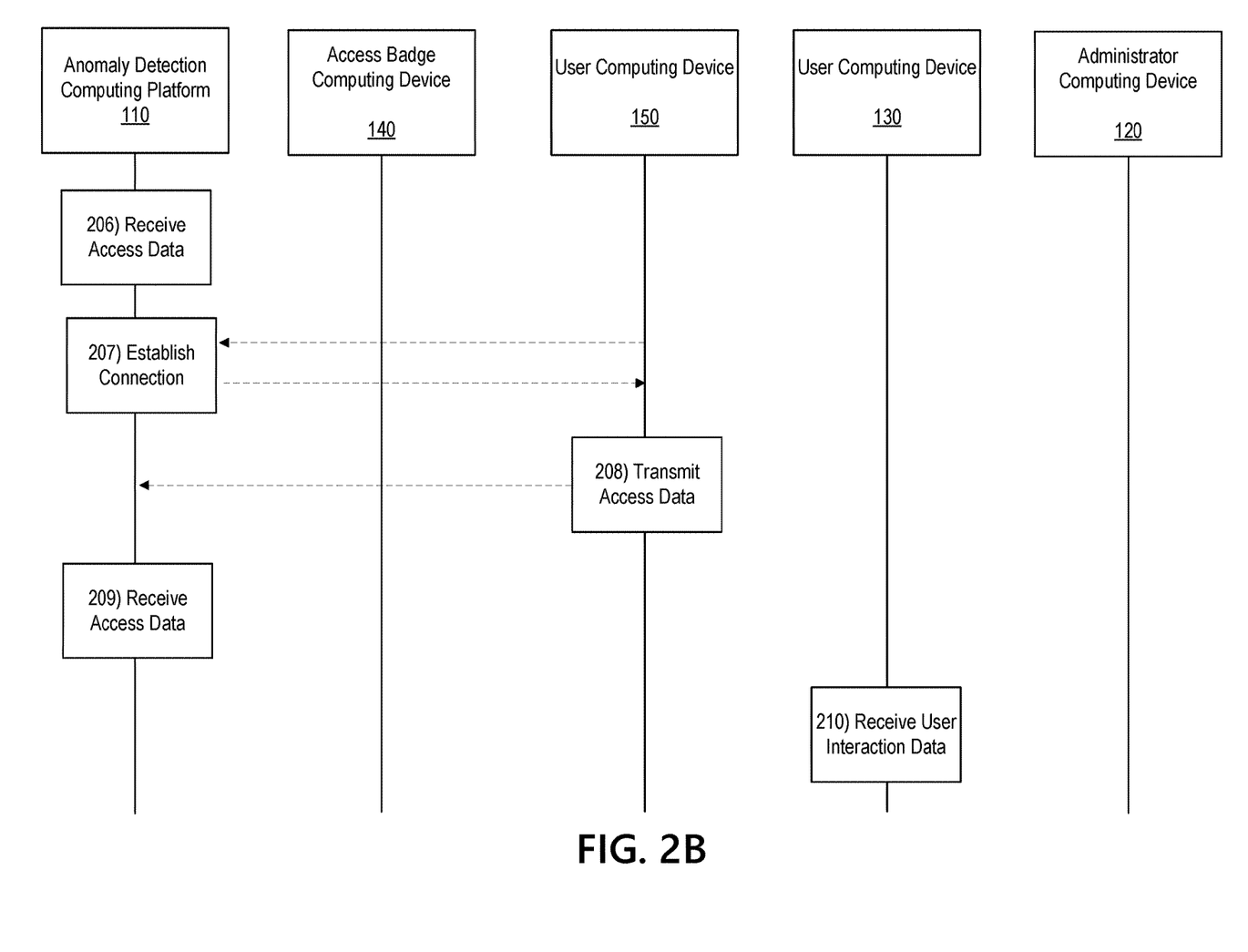

With reference to FIG. 2B, at step 206, anomaly detection computing platform 110 may receive the access or location data transmitted or sent by the access badge reader computing device 140 at step 205.

At step 207, anomaly detection computing platform 110 may establish a wireless connection with user computing device 150 which may, e.g., be a mobile device of the user associated with the enterprise organization. For instance, a second wireless connection may be established between anomaly detection computing platform 110 and the user computing device 150. Upon establishing the second wireless connection, a communication session may be initiated between the anomaly detection computing platform 110 and the user computing device 150.

At step 208, user computing device 150 may transmit or send location data associated with a respective user of the user computing device 150 (e.g., with permission of the user). For instance, as a user moves throughout a work space or location during the course of a work day, location data associated with the user may be captured and transmitted to the anomaly detection computing platform 110. The location data may include GPS data captured by the user computing device 150 and may be real-time or near real-time data.

At step 209, anomaly detection computing platform 110 may receive the location data transmitted or sent by the user computing device 150 at step 208.

At step 210, user computing device 130 which may, e.g., be a laptop, desktop or other computing device used by a respective user during the course of a work day to perform one or more job functions, may receive user interaction data. For instance, as a user performs one or more job functions, user interaction data may be captured. In some examples, the user interaction data may include keyboard or mouse input data, systems, applications and/or data accessed by the user, a sequence or order of applications or systems accessed, content of communications sent internally and externally, content of attachments sent internally or externally, printer use, and the like.

Figure 2C:
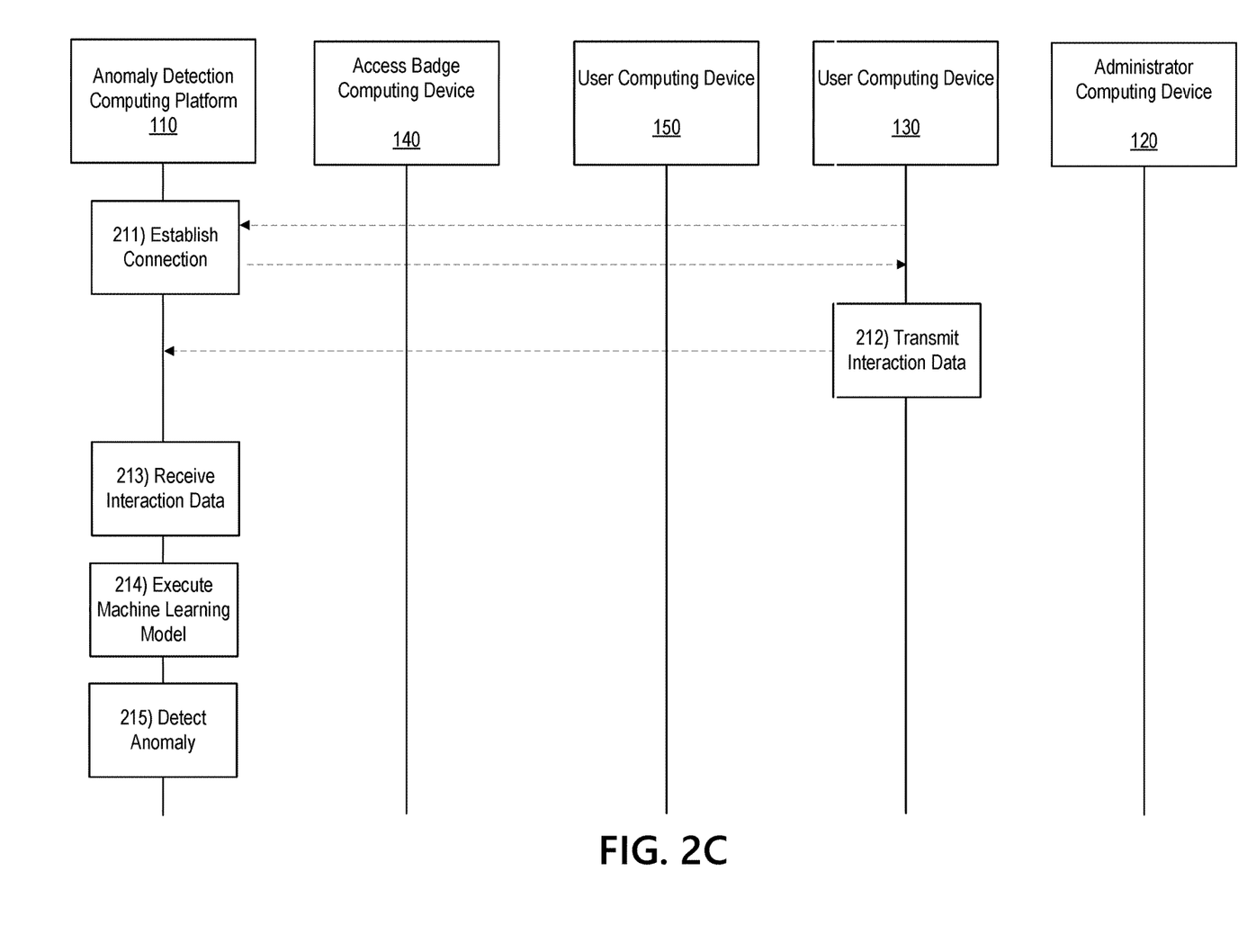

With reference to FIG. 2C, at step 211, anomaly detection computing platform 110 may establish a wireless connection with user computing device 130. For instance, a third wireless connection may be established between anomaly detection computing platform 110 and the user computing device 130. Upon establishing the third wireless connection, a communication session may be initiated between the anomaly detection computing platform 110 and the user computing device 130.

At step 212, user computing device 130 may transmit or send the user interaction data to the anomaly detection computing platform 110.

At step 213, anomaly detection computing platform 110 may receive the user interaction data transmitted at step 212.

At step 214, anomaly detection computing platform 110 may execute the machine learning model. For instance, anomaly detection computing platform 110 may input, to the machine learning model, the user interaction data received at step 213, as well as the access location data received at step 206 and the computing device location data received at step 209. The model may be executed to evaluate the data and any anomalies may be detected. For instance, differences between baseline or user profile behaviors or operation patterns for a respective user and the current data may be detected by the machine learning analysis. Although the arrangements described including using location data received from both one or more access badge reader computing devices and user computing devices, in some examples, location data from one of the devices may be used.

At step 215, the machine learning model may output any detected anomalies. For instance, differences in typing or mouse input patterns or speed, differences in types of data or systems being accessed, unexpected location information, or the like, may be output as detected anomalies.

Figure 2D:
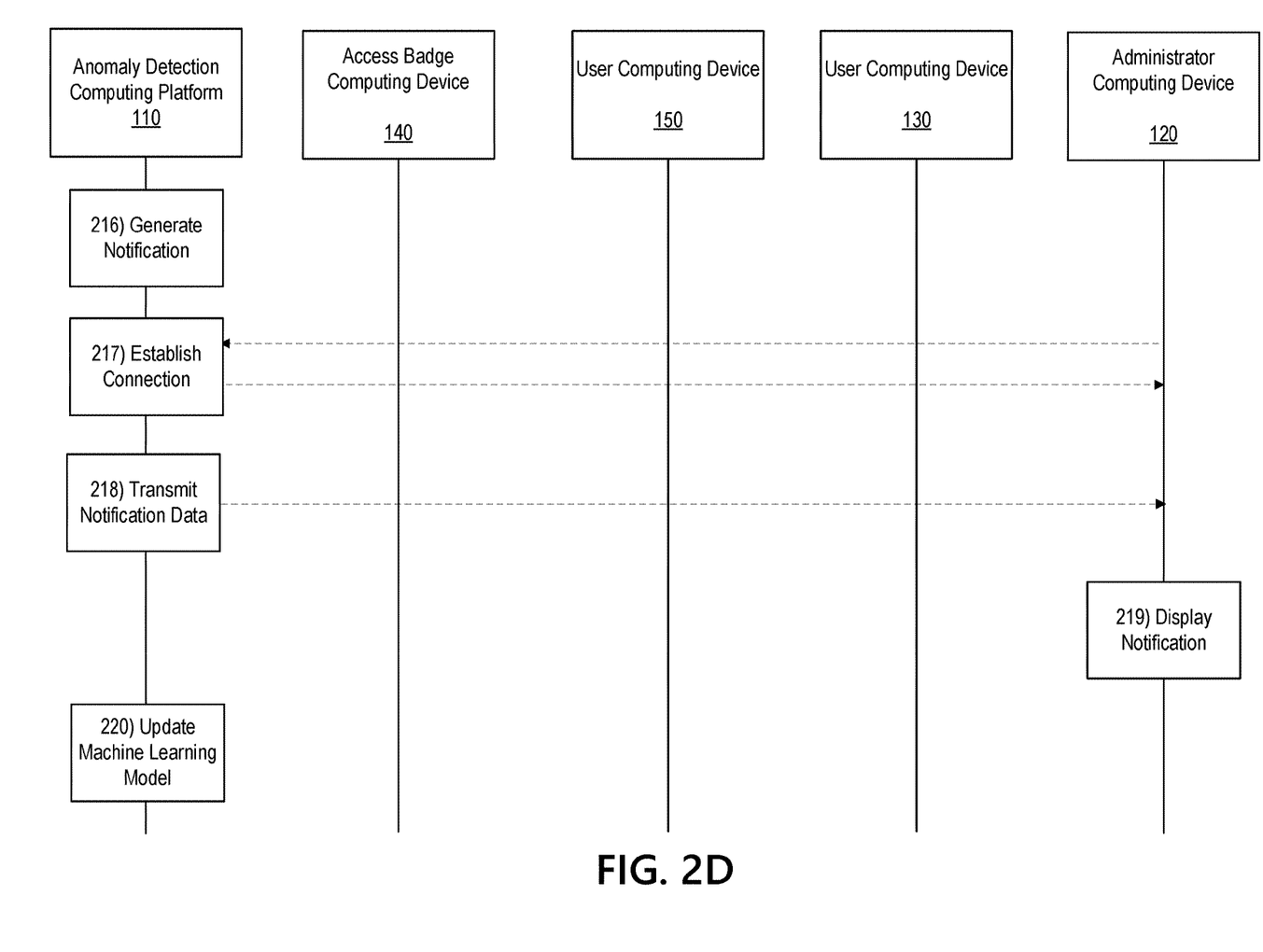
Figure 4:
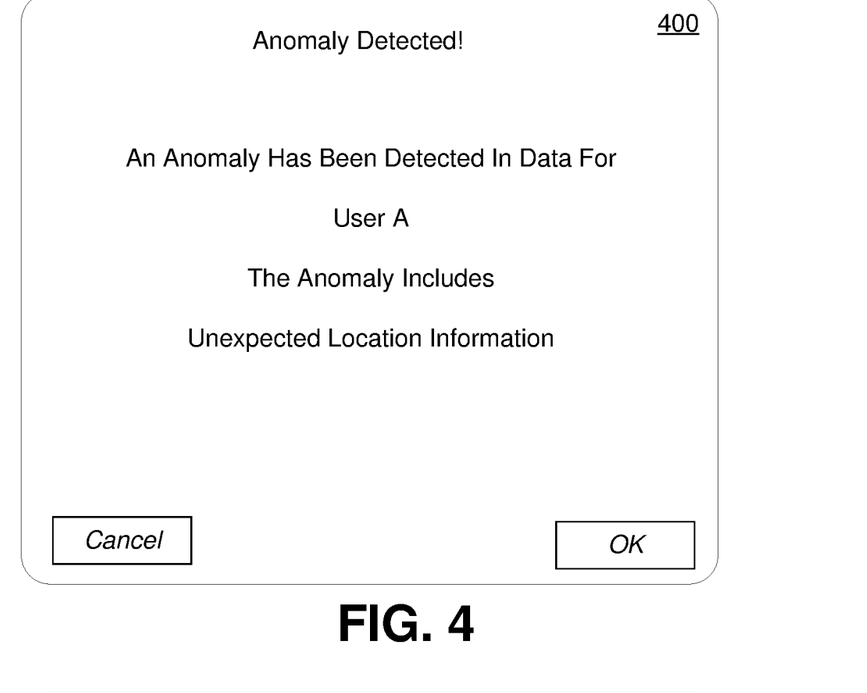
FIGS. 4-6 illustrate example graphical user interfaces that may be generated in accordance with one or more aspects described herein.

With reference to FIG. 2D, at step 216, anomaly detection computing platform 110 may generate a notification identifying any detected anomalies. In some examples, the notification may be a static notification identifying the anomalies. One example static notification 400 is shown in FIG. 4 and includes identification of the user and anomaly.

Figure 5:
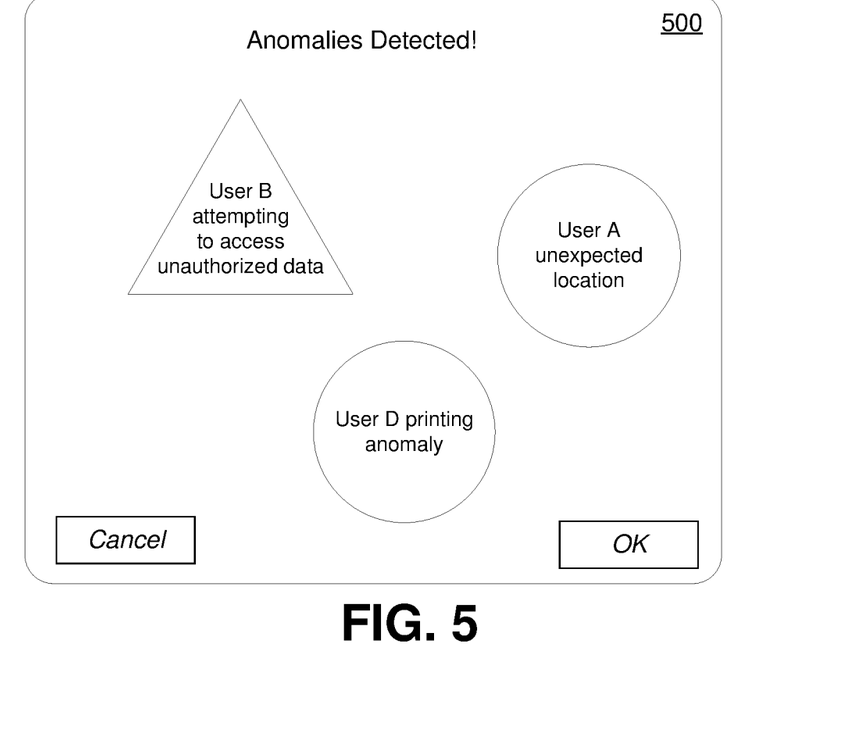
Figure 6:
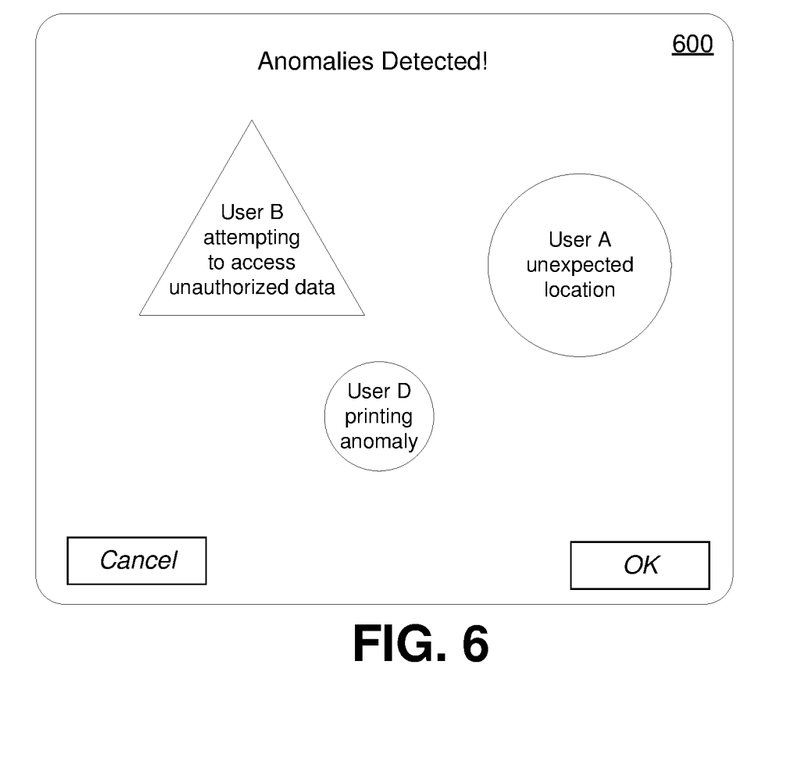

Additionally or alternatively, the anomaly detection computing platform 110 may generate a dynamic notification that may include one or more dynamic elements identifying one or more anomalies for one or more users. In some examples, the dynamic interface elements may vary in size, color and/or shape based on a type of anomaly, potential impact to systems, status of anomaly, and the like. For instance, FIG. 5 illustrates one example notification 500 that includes identification of multiple anomalies for multiple different users. For instance, user A has an unexpected location detected and is shown as a circle of a first size, user B is attempting to access unauthorized data which is shown as a triangle in a first size, and user D has a printing anomaly shown as a circle in a first size. In some examples, notification 500 may receive additional status data related to the one or more anomalies (e.g., has an administrator been assigned to evaluate the anomaly, does subsequent data reflect a change that might explain the anomaly, or the like). In some examples, a size, shape and/or color of the interface elements may change based on the newly received status data. For instance, as shown in FIG. 6, the interface 600 includes the anomaly for user D shown in a second, smaller size than in FIG. 5 to indicate, for instance, that an administrator is assigned, while anomalies for users A and B are shown in a same size as FIG. 5 which may indicate no change in status. Various other changes to the interface elements may be used to convey urgency, status, or the like, without departing from the invention.

At step 217, anomaly detection computing platform 110 may establish a wireless connection with administrator computing device 120. For instance, a fourth wireless connection may be established between anomaly detection computing platform 110 and the administrator computing device 120. Upon establishing the fourth wireless connection, a communication session may be initiated between the anomaly detection computing platform 110 and the administrator computing device 120.

At step 218, anomaly detection computing platform 110 may transmit or send the notification to the administrator computing device 120. In some examples, transmitting or sending the notification may cause the administrator computing device 120 to display the notification on a display of administrator computing device 120.

At step 219, administrator computing device 120 may receive and display the notification.

At step 220, anomaly detection computing platform 110 may update and/or validate the machine learning model. For instance, based on detected anomalies, mitigating actions taken, and the like, the machine learning model may be updated via a dynamic feedback loop. Accordingly, the machine learning model may be continuously or near-continuously updated to improve accuracy in anomaly detection.

In some instances, anomaly detection computing platform 110 may continuously update, validate, refine, or the like, the machine learning model. In some examples, the anomaly detection computing platform 110 may maintain an accuracy threshold for the machine learning model and may pause refinement (through the dynamic feedback loop) of the model if the corresponding accuracy is identified as greater than the accuracy threshold. Further, if the accuracy is at or below the accuracy threshold, the anomaly detection computing platform 110 may resume refinement of the model through the corresponding dynamic feedback loop.

Figure 3:
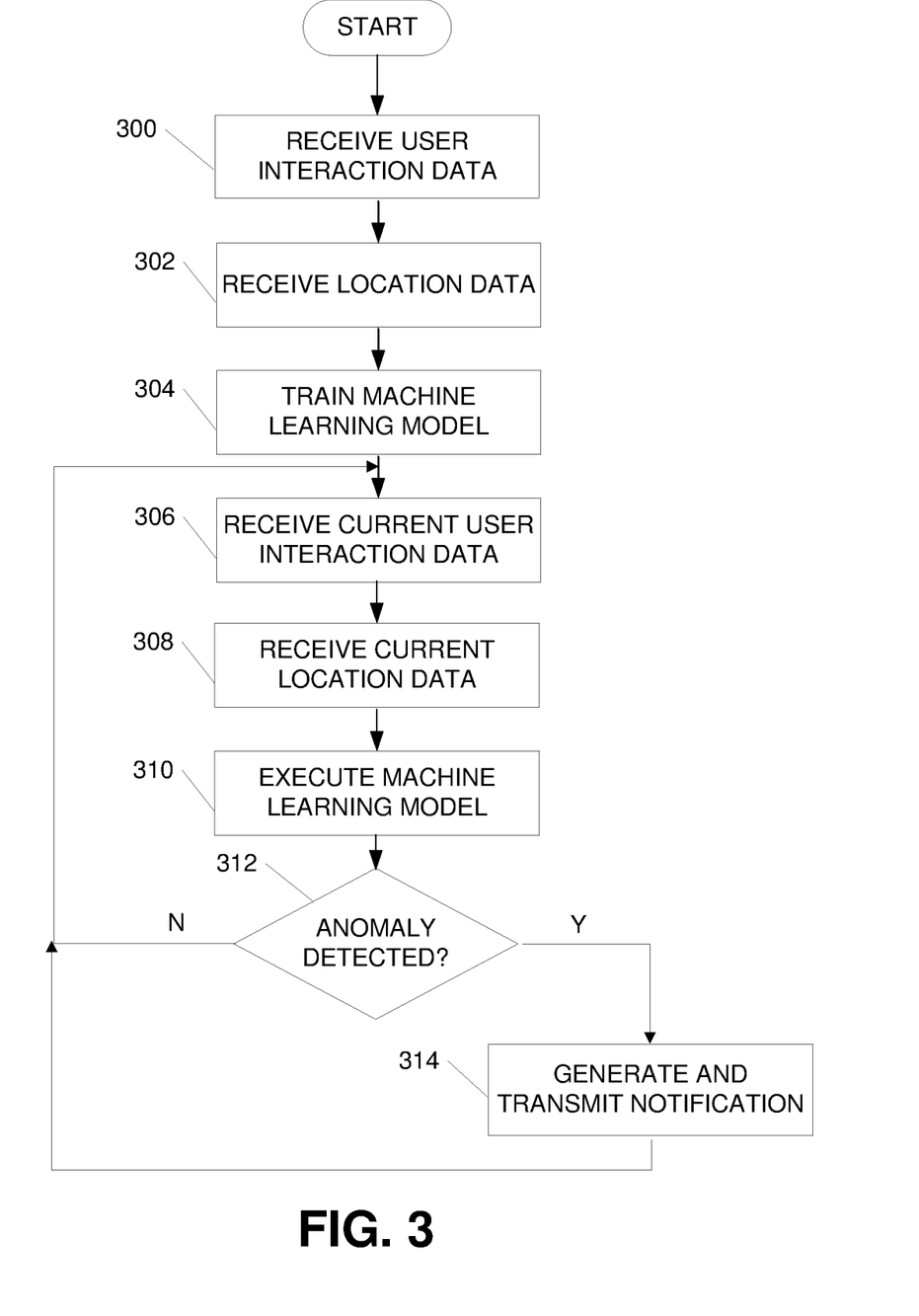
FIG. 3 depicts an illustrative method for machine learning-based anomaly detection in accordance with one or more aspects described herein.

FIG. 3 is a flow chart illustrating one example method of anomaly detection in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as anomaly detection computing platform 110, may receive historical user interaction data. In some examples, the historical user interaction data may be captured by and received from a plurality of computing devices operated by users in an enterprise organization. Additionally or alternatively, the user interaction data may be received from a database. The user interaction data may include data captured during the course of business as a user interacts with their computing device. The user interaction data may include user input via keyboard or mouse, content of communications, printing history, applications or systems accessed, and the like.

At step 302, the computing platform may receive historical location data associated with the users in the enterprise organization. For instance, location data captured via access badge reader computing devices and/or mobile devices of the user during the course of business or a work day may be captured and received by the computing platform.

At step 304, the computing platform may train a machine learning model to identify, based on current user interaction and location data, an anomaly in user behavior or pattern data. For instance, the historical user interaction data and location data may be used to train the machine learning model to identify correlations between users and one or more patterns or behaviors.

At step 306, the computing platform may receive current user interaction data. For instance, real-time or near real-time, user interaction data may be received from computing devices associated with one or more users in the enterprise organization. In some examples, the current user interaction data may be received continuously or near-continuously during a predetermined time period, such as during expected business hours of a respective user.

At step 308, the computing platform may receive current location data of the one or more users. For instance, the computing platform may receive, from at least one of: an access badge reader computing device or a mobile device of a respective user, current location data of the respective user. In some examples, the current location data may be continuously or near-continuously received during a predetermined time period, such as during expected business hours for the respective user.

At step 310, the computing platform may execute the machine learning model. For instance, the computing platform may input, to the machine learning model, the current user interaction data and current location data received. The model may be executed to identify or detect one or more anomalies in the current user interaction data and/or current location data.

At step 312, a determination may be made as to whether any anomalies have been detected in the data. If not, the process may return to step 306 to receive additional or subsequent user interaction data, location data, and the like, and may further analyze the data for anomalies.

If, at step 312, one or more anomalies are detected, at step 314, the computing platform may generate a notification identify the detected anomaly. The notification may, in some examples, include interactive interface elements that may change in size, shape and/or color based on later received data. The computing platform may transmit or send the notification to an administrator computing device. In some examples, transmitting or sending the notification to the administrator computing device may cause the administrator computing device to display the notification on a display of the administrator computing device.

Accordingly, aspects described herein are directed to using machine learning to detect anomalies in user patterns in order to quickly and efficiently address any anomalies. By building robust user profiles that include a variety of user pattern factors, anomalies that normally would not be caught until after an impact is felt, may be identified early and mitigating steps taken to avoid impact. For instance, behaviors that may indicate potential insider threat activity may be identified early and addressed prior to damage being done.

For instance, conventional arrangements typically identify an incident involving an employee and then look to explore the employee's history of user of enterprise organization resources to identify potential impact of the incident. However, this reactive arrangement leads to hastily compiled data identified after an incident is identified. Accordingly, the arrangements described herein allow for a proactive approach to identify potential anomalies in advance of incident detection based on data compiled for each user. Accordingly, data is continuously compiled for users and can be accessed upon detection of an anomaly or upon occurrence of an incident.

As discussed herein, one or more notifications may be generated upon detection of an anomaly. In some examples, notifications may be static and identify the user, anomaly, and the like. Additionally or alternatively, the notifications may be dynamic and may include interface elements that may change in size, shape and/or color based on later received data (e.g., additional anomalies, identified impact (e.g., upstream or downstream), status of the anomaly, and the like). In some examples, selection of the interface element may cause display of another user interface (e.g., a pop-up interface) providing additional details about the anomaly, impacts, and the like. In some arrangements, a static notification may include a selectable link that may cause redirection of the administrator to a dynamic interface, such as a dashboard, that may include information related to a plurality of anomalies, users, and the like.

In some examples, the notifications may include indications of a status of controls. For instance, technology issues may be coupled with detected user anomalies to provide a more robust indication of a status of systems, applications, and/or other controls related data.

Further, by evaluating current location data associated with users, the system may quickly identify users operating out of an unexpected location that might not be an authorized location for location, may require additional security measures, or the like. For instance, a user may have an expected location but may log in from an alternate location. If this alternate location is expected (e.g., based on machine learning analysis of historical pattern data for that user), an anomaly might not be identified (e.g., perhaps the user travels to a second enterprise organization location for a weekly meeting). However, if the alternate location is not detected in the pattern for the user, an anomaly may be identified and mitigating action or further evaluation may be executed. For instance, a user may be working from home on a given day and so further investigation would indicate that the anomaly is not a concern. However, the user may be working from a foreign country that requires additional security or perhaps requires implementation of different enterprise organization policies. Accordingly, mitigating actions may be identified and executed based on detection of that anomaly.

In some examples, the captured data may aid in proper management of incidents or emergency situations. For instance, if a natural disaster strikes an enterprise organization location, the real-time location data captured may be used to identify employees who are expected to be at the location and need to be accounted for. In another example, if internal communications from a user indicate that the user is unhappy with a situation, steps may be taken to work with the user to address issues and resolve the situation.

Although various aspects described herein are discussed in the context of identifying anomalies for a particular user, in some examples, data may be analyzed to identify anomalies for a group, business unit, or the like, within the enterprise organization. For instance, keystroke data may be analyzed across a business unit to identify high performing users within the group. In another example, groups may have different seasons in which certain activities increase. For instance, some business groups might have an end of year season where many documents are printed. The printing activity for the group may be evaluated and, because the increase corresponds to an expected seasonal increase in printing, no anomaly may be detected. However, if another group is unexpectedly seeing an increase in printing activity, that may indicate an anomaly. In another example, if users within a group unexpectedly start attempting to access systems, applications or data outside of their norm, an anomaly may be detected. Various other examples of evaluating group patterns may be used without departing from the invention.

Figure 7:
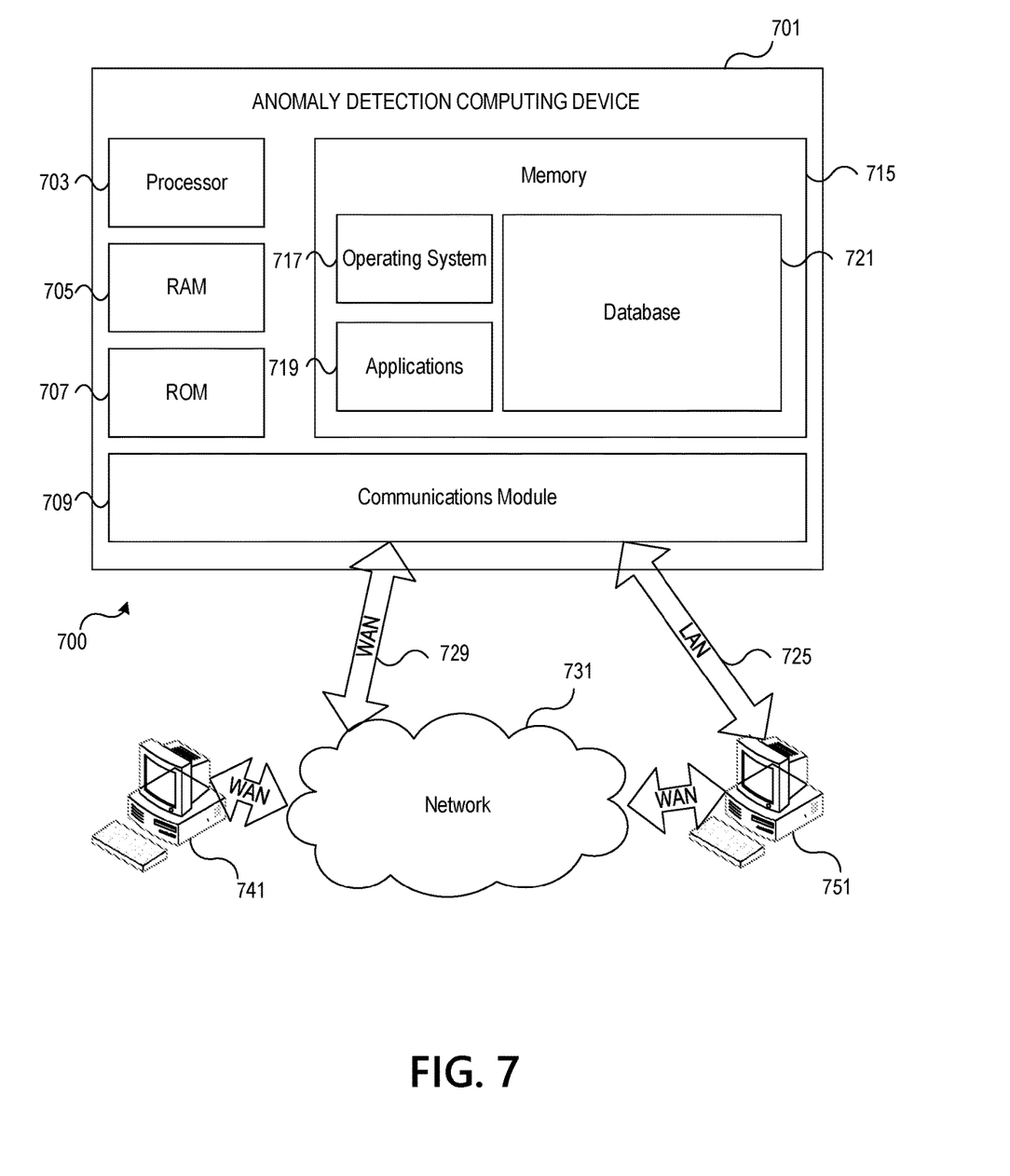
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include anomaly detection computing device 701 having processor 703 for controlling overall operation of anomaly detection computing device 701 and its associated components, including Random Access Memory (RAM) 705, Read-Only Memory (ROM) 707, communications module 709, and memory 715. Anomaly detection computing device 701 may include a variety of computer readable media. Computer readable media may be any available media that may be accessed by anomaly detection computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by anomaly detection computing device 701.

Although not required, various aspects described herein may be embodied as a method, a data transfer system, or as a computer-readable medium storing computer-executable instructions. For example, a computer-readable medium storing instructions to cause a hardware processor to perform steps of a method in accordance with aspects of the disclosed embodiments is contemplated. For example, aspects of method steps disclosed herein may be executed on a processor on anomaly detection computing device 701. Such a processor may execute computer-executable instructions stored on a computer-readable medium.

Software may be stored within memory 715 and/or storage to provide instructions to processor 703 for enabling anomaly detection computing device 701 to perform various functions as discussed herein. For example, memory 715 may store software used by anomaly detection computing device 701, such as operating system 717, application programs 719, and associated database 721. Also, some or all of the computer executable instructions for anomaly detection computing device 701 may be embodied in hardware or firmware. Although not shown, RAM 705 may include one or more applications representing the application data stored in RAM 705 while anomaly detection computing device 701 is on and corresponding software applications (e.g., software tasks) are running on anomaly detection computing device 701.

Communications module 709 may include a microphone, keypad, touch screen, and/or stylus through which a user of anomaly detection computing device 701 may provide input, and may also include one or more of a speaker for providing audio output and a video display device for providing textual, audiovisual and/or graphical output. Computing system environment 700 may also include optical scanners (not shown).

Anomaly detection computing device 701 may operate in a networked environment supporting connections to one or more other computing devices, such as computing device 741 and 751. Computing devices 741 and 751 may be personal computing devices or servers that include any or all of the elements described above relative to anomaly detection computing device 701.

The network connections depicted in FIG. 7 may include Local Area Network (LAN) 725 and Wide Area Network (WAN) 729, as well as other networks. When used in a LAN networking environment, anomaly detection computing device 701 may be connected to LAN 725 through a network interface or adapter in communications module 709. When used in a WAN networking environment, anomaly detection computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive historical user interaction data associated with a plurality of users associated with an enterprise organization;
   receive historical location data associated with the plurality of users associated with the enterprise organization;
   train a machine learning model to identify, based on current user interaction data and location data, an anomaly in user pattern data;
   receive, from a plurality of computing devices, current user interaction data for one or more users of the plurality of users;
   receive, from at least one of: an access badge reader computing device or a mobile computing device of a respective user of the one or more users of the plurality of users, real-time location data;
   execute the machine learning model, wherein executing the machine learning model includes inputting, to the machine learning model, the current user interaction data and real-time location data of the one or more users of the plurality of users to output, upon execution of the machine learning model, one or more detected anomalies in user pattern data of the one or more users of the plurality of users;
   generate a notification identifying the one or more detected anomalies; and transmit, to an administrator computing device, the notification, wherein transmitting the notification causes the administrator computing device to display the notification on a display of the administrator computing device.

2. The computing platform of claim 1, wherein the current user interaction data includes identification of one or more applications accessed by a respective user.

3. The computing platform of claim 2, wherein the current user interaction data includes a sequence in which the one or more applications were accessed by the respective user.

4. The computing platform of claim 1, wherein the current user interaction data includes mouse input data and keyboard input data.

5. The computing platform of claim 1, wherein the real-time location data includes continuous location data received during a predetermined time period.

6. The computing platform of claim 5, wherein the predetermined time period includes expected business hours for the respective user.

7. The computing platform of claim 5, wherein the current user interaction data is received continuously during the predetermined time period.

8. The computing platform of claim 1, wherein the plurality of users are employees of the enterprise organization.

9. The computing platform of claim 1, wherein the notification includes dynamic interface elements that change in one of: size, shape, or color, in response to receiving additional data related to the one or more detected anomalies.

10. A method, comprising:
receiving, by a computing platform, the computing platform having at least one processor and memory, historical user interaction data associated with a plurality of users associated with an enterprise organization;
receiving, by the at least one processor, historical location data associated with the plurality of users associated with the enterprise organization;
training, by the at least one processor, a machine learning model to identify, based on current user interaction data and location data, an anomaly in user pattern data;
receiving, by the at least one processor and from a plurality of computing devices, current user interaction data for one or more users of the plurality of users;
receiving, by the at least one processor and from at least one of: an access badge reader computing device or a mobile computing device of a respective user of the one or more users of the plurality of users, real-time location data;
executing by the at least one processor, the machine learning model, wherein executing the machine learning model includes inputting, to the machine learning model, the current user interaction data and real-time location data of the one or more users of the plurality of users to output, upon execution of the machine learning model, one or more detected anomalies in user pattern data of the one or more users of the plurality of users;
generating, by the at least one processor, a notification identifying the one or more detected anomalies; and
transmitting, by the at least one processor and to an administrator computing device, the notification, wherein transmitting the notification causes the administrator computing device to display the notification on a display of the administrator computing device.

11. The method of claim 10, wherein the current user interaction data includes identification of one or more applications accessed by a respective user.

12. The method of claim 11, wherein the current user interaction data includes a sequence in which the one or more applications were accessed by the respective user.

13. The method of claim 10, wherein the current user interaction data includes mouse input data and keyboard input data.

14. The method of claim 10, wherein the real-time location data includes continuous location data received during a predetermined time period.

15. The method of claim 14, wherein the predetermined time period includes expected business hours for the respective user.

16. The method of claim 14, wherein the current user interaction data is received continuously during the predetermined time period.

17. The method of claim 10, wherein the plurality of users are employees of the enterprise organization.

18. The method of claim 10, wherein the notification includes dynamic interface elements that change in one of: size, shape, or color, in response to receiving additional data related to the one or more detected anomalies.

19. One or more non-transitory computer-readable media storing instructions that, when executed by a computing platform comprising at least one processor, memory, and a communication interface, cause the computing platform to:
receive historical user interaction data associated with a plurality of users associated with an enterprise organization;
receive historical location data associated with the plurality of users associated with the enterprise organization;
train a machine learning model to identify, based on current user interaction data and location data, an anomaly in user pattern data;
receive, from a plurality of computing devices, current user interaction data for one or more users of the plurality of users;
receive, from at least one of: an access badge reader computing device or a mobile computing device of a respective user of the one or more users of the plurality of users, real-time location data;
execute the machine learning model, wherein executing the machine learning model includes inputting, to the machine learning model, the current user interaction data and real-time location data of the one or more users of the plurality of users to output, upon execution of the machine learning model, one or more detected anomalies in user pattern data of the one or more users of the plurality of users;
generate a notification identifying the one or more detected anomalies; and
transmit, to an administrator computing device, the notification, wherein transmitting the notification causes the administrator computing device to display the notification on a display of the administrator computing device.

20. The one or more non-transitory computer-readable media of claim 19, wherein the notification includes dynamic interface elements that change in one of: size, shape, or color, in response to receiving additional data related to the one or more detected anomalies.

* * * * *